(12) United States Patent
Park

(10) Patent No.: US 7,344,466 B2
(45) Date of Patent: Mar. 18, 2008

(54) HYDRAULIC CONTROL SYSTEM OF 7-SPEED AUTOMATIC TRANSMISSION FOR VEHICLE

(75) Inventor: Jin Mo Park, Gwacheon (KR)

(73) Assignee: Hyundai Motor Company, Seoul (KR)

( * ) Notice: Subject to any disclaimer, the term of this patent is extended or adjusted under 35 U.S.C. 154(b) by 294 days.

(21) Appl. No.: 11/213,474

(22) Filed: Aug. 25, 2005

(65) Prior Publication Data

US 2007/0049446 A1   Mar. 1, 2007

(51) Int. Cl.
  *F16H 61/12* (2006.01)
(52) U.S. Cl. .................. 475/116; 475/119; 475/128; 477/906
(58) Field of Classification Search ............. None
  See application file for complete search history.

(56) References Cited

U.S. PATENT DOCUMENTS

| 2001/0014638 A1* | 8/2001 | Suzuki et al. ............ 475/119 |
| 2003/0040389 A1* | 2/2003 | Kim et al. ................ 475/128 |
| 2007/0049447 A1* | 3/2007 | Park ......................... 475/116 |

FOREIGN PATENT DOCUMENTS

| DE | 10358005 B3 | 1/2005 |
| DE | 102004016489 A1 | 3/2005 |

* cited by examiner

*Primary Examiner*—Sherry Estremsky
(74) *Attorney, Agent, or Firm*—Morgan Lewis & Bockius LLP

(57) ABSTRACT

A hydraulic control system of a seven-speed automatic transmission that provides enhanced overall performance by achieving precise and effective control by providing a fail-safe function in at least two ways.

23 Claims, 8 Drawing Sheets

FIG.2

|  | C1 | C2 | C3 | C4 | B1 | B2 | F |
|---|---|---|---|---|---|---|---|
| 1st Gear | ○ |  |  | ○ | E |  | ○ |
| 2nd Gear | ○ |  |  | ○ |  | ○ |  |
| 3rd Gear | ○ | ○ |  | ○ |  |  |  |
| 4th Gear | ○ |  | ○ | ○ |  |  |  |
| 5th Gear | ○ | ○ | ○ |  |  |  |  |
| 6th Gear |  | ○ | ○ | ○ |  |  |  |
| 7th Gear |  |  | ○ | ○ |  | ○ |  |
| Reverse Gear |  | ○ |  | ○ | ○ |  |  |

HYDRAULIC CONTROL SYSTEM OF 7-SPEED AUTOMATIC TRANSMISSION FOR VEHICLE

BACKGROUND OF THE INVENTION

1. Field of the Invention

The present invention relates to a hydraulic control system of a seven-speed automatic transmission for a vehicle. More particularly, the present invention relates to such a control system that minimizes shift shock and reduces fuel consumption.

2. Description of the Related Art

Typical automatic transmissions include a torque converter and a powertrain of a multiple speed gear mechanism connected to the torque converter. In addition, a hydraulic control system is provided in an automatic transmission for selectively operating at least one operational element included in the powertrain according to a running state of a vehicle.

Such an automatic transmission includes a powertrain and a hydraulic control system. The powertrain includes a compound planetary gear set formed by combining at least two simple planetary gear sets to achieve the required multiple speeds and a plurality of friction members. The hydraulic control system selectively operates the friction members of the powertrain according to driving conditions.

A variety of such powertrains and hydraulic control systems have been developed by vehicle manufacturers according to their own schemes. Currently, four-speed automatic transmissions are most often found on the market. However, five-speed and six-speed automatic transmissions have also been realized for enhancement of performance of power transmission and for enhanced fuel mileage of a vehicle.

Recently, developing further from such six-speed automatic transmissions, seven-speed automatic transmissions are under investigation such that performance of power transmission of an automatic transmission, and thereby fuel-mileage of a vehicle are further enhanced.

The above information disclosed in this Background section is only for enhancement of understanding of the background of the invention and therefore, it may contain information that does not form the prior art that is already known in this country to a person or ordinary skill in the art.

SUMMARY OF THE INVENTION

Enhancements of the present invention provide a hydraulic control system applicable to a powertrain of a seven-speed automatic transmission for a vehicle having six friction members, thereby obtaining an enhanced overall performance by achieving a minimization of shift shock and an enhancement of fuel consumption. Such enhancements may be achieved through precise and effective control, including by providing a fail-safe function in at least two ways.

A hydraulic control system of a automatic transmission for a vehicle according to an exemplary embodiment of the present invention includes a first clutch control portion, a first brake and third clutch control portion, a second clutch control portion, a second brake control portion, and a fourth clutch control portion. The first clutch control portion controls a forward range pressure according to a control of a first proportional control solenoid valve so as to supply the forward range pressure to a first clutch at first, second, third, fourth, fifth forward speeds and prevents hydraulic pressure from being supplied to the first clutch when the first proportional control solenoid valve is turned off at fourth, fifth, sixth, and seventh forward speeds. The first brake and third clutch control portion controls and selectively supplies the forward range pressure to a first brake or a third clutch according to a control of a second proportional control solenoid valve at the fourth, fifth, sixth, and seventh forward speeds, a low L range, and a reverse R range and maintains a hydraulic line to the third clutch at the fourth, fifth, sixth, and seventh forward speeds in the case that an on/off solenoid valve controlling a spool valve controlling the hydraulic line to the third clutch malfunctions to be turned off.

The second clutch control portion supplies a line pressure to a second clutch according to a control of a third proportional control solenoid valve at the third, fifth, and sixth forward speeds and a reverse speed.

The second brake control portion supplies the forward range pressure to a second brake according to a control of a fourth proportional control solenoid valve at the second and seventh forward speeds and controls an operating pressure of the second brake to be larger at the seventh forward speed than at the second forward speed.

The fourth clutch control portion supplies an operating pressure to the fourth clutch according to a control of the fifth proportional control solenoid valve at the first, second, third, fourth, sixth, and seventh forward speeds and the reverse speed.

In a further embodiment, the first, second, third, and fifth proportional control solenoid valves are duty control valves outputting a maximum hydraulic pressure in a turned-off state; and the fourth proportional control solenoid valve is a duty control valves outputting a minimum hydraulic pressure in a turned-off state.

In a further embodiment, the first clutch control portion includes: a first clutch side switching valve and a first clutch side pressure control valve controlled by the first proportional control solenoid valve; and a first switching valve controlling operating pressure supply to the first clutch through the first clutch side pressure control valve by controlling a hydraulic line of the forward range pressure supplied from a manual valve.

In a further embodiment, the first clutch side switching valve includes: a valve body including a first port receiving a control pressure from the first proportional control solenoid valve, a second port formed at an opposite side of the first port and receiving a reduced pressure of the reducing valve as its control pressure, a third port partially receiving the operating pressure supplied to the first clutch, and a fourth port selectively supplying the hydraulic pressure received through the third port to the first clutch side pressure control valve as a control pressure thereof; and a valve spool including a first land receiving the control pressure supplied from the first port, and a second land receiving the control pressure supplied through the second port and selectively enabling communication of the third and fourth ports, cooperatively with the first land, wherein the first land is provided with an elastic member forming an elastic force that always biases the valve spool to the left in the drawing.

In a further embodiment, the first clutch pressure control valve includes: a valve body including a first port receiving a control pressure from the first clutch side switching valve, a second port receiving a control pressure from the first proportional control solenoid valve, a third port receiving an operating pressure of the first clutch supplied from the first switching valve, a fourth port selectively supplying the hydraulic pressure received through the third port to the first clutch, and a fifth port returning the hydraulic pressure received through the fourth port; and a valve spool including a first land selectively closing the third port by the control pressure received through the first port, a second land enabling communication of the third and fourth ports or the fourth and fifth ports in cooperation with the first land, and a third land receiving the control pressure supplied through the second port, wherein an elastic member is disposed between the first land and the valve body.

In a further embodiment, wherein the first switching valve includes: a valve body including a first port receiving a forward range pressure, a second port receiving the line pressure as its control pressure, a third port supplying the hydraulic pressure received through the first port to the first clutch side pressure control valve, a fourth port receiving the operating pressures of the second clutch and the second brake as its control pressure, a fifth port receiving the operating pressure of the fourth clutch as its control pressure, a sixth port receiving the operating pressure of the third clutch as its control pressure, and a seventh port exhausting the hydraulic pressure received through the third port; and a valve spool including a first land receiving the control pressure supplied through the second port, a second land receiving the hydraulic pressure supplied through the fifth port and selectively enabling communication of the third port to the first and sixth ports, a third land receiving the control pressure supplied through the fifth port, and a fourth land receiving the control pressure supplied through the fourth port, wherein an elastic member is disposed between the third land and the valve body.

In a further embodiment, the first switching valve is structured such that while the control pressure is supplied through the first port, the valve spool moves toward the first port only when the control pressures are supplied through all of the fourth, fifth, and sixth ports.

In a further embodiment, the first brake and third clutch control portion includes: a third clutch side switching valve and a third clutch side pressure control valve controlled by the second proportional control solenoid valve; a control valve controlled by the liner pressure and an on/off solenoid valve and enabling hydraulic line conversion of hydraulic pressure supplied from the third clutch side pressure control valve; a second switching valve controlled by an on/off solenoid valve and supplying the hydraulic pressure supplied from the control valve to the third clutch.

In a further embodiment, the third clutch side switching valve includes: a valve body including a first port receiving a control pressure from the second proportional control solenoid valve, a second port formed at an opposite side of the first port and receiving a reduced pressure of the reducing valve as its control pressure, a third port partially receiving the operating pressure supplied to the first brake or the third clutch, and a fourth port selectively supplying the hydraulic pressure received through the third port to the third clutch side pressure control valve as a control pressure thereof; and a valve spool including a first land receiving the control pressure supplied from the first port and a second land receiving the control pressure supplied through the second port and selectively enabling communication of the third and fourth ports, wherein the first land is provided with an elastic member forming an elastic force that always biases the valve spool to the left in the drawing.

In a further embodiment, the third clutch side pressure control valve includes: a valve body including a first port receiving a control pressure from the second proportional control solenoid valve, a second port receiving a control pressure from the third clutch side switching valve, a third port receiving the forward range pressure from the manual valve, a fourth port supplying the hydraulic pressure received through the third port to the control valve and the third clutch side switching valve, and a fifth port returning the hydraulic pressure received through the fourth port; and a valve spool including a first land selectively closing the third port by the control pressure received through the second port, a second land enabling communication of the third and fourth ports or the fourth and fifth ports in cooperation with the first land, and a third land receives the control pressure supplied through the second port, wherein an elastic member is disposed between the first land and the valve body.

In a further embodiment, the control valve includes: a valve body including a first port receiving the line pressure, a second port receiving a control pressure from the second on/off solenoid valve, a third port receiving a hydraulic pressure from the third clutch side pressure control valve, a fourth port supplying the hydraulic pressure received through the third port to the first brake as an operating pressure thereof, a fifth port supplying the hydraulic pressure received through the third port to the second switching valve, a sixth port exhausting the hydraulic pressure supplied through the fifth port, and a seventh port receiving an operating pressure from the third clutch as its control pressure; and a valve spool including a first land receiving a control pressure supplied through the second port, a second land selectively enabling communication of the fourth port to an exhaust port, a third land selectively enabling communication of the third port to the fourth and fifth ports, a fourth land selectively opening the fifth port by the control pressure supplied through the first port, and a fifth land receiving the control pressure supplied through the seventh port.

In a further embodiment, the second switching valve includes: a valve body including a first port receiving a control pressure from the fourth proportional control solenoid valve, a second port supplying the control pressure received through the first port to the second brake side pressure control valve, a third port receiving a hydraulic pressure from the control valve as an operating pressure for the third clutch, a fourth port supplying the hydraulic pressure received through the third port to the third clutch, a fifth port exhausting the hydraulic pressure supplied through the fourth port, sixth and seventh ports bifurcated from the fourth port and utilizing the hydraulic pressure output from the fourth port as a control pressure of the second switching valve, and an eighth port receiving a control pressure from the first on/off solenoid valve; and a valve spool including a first land selectively opening the first port, a second land selectively enabling communication of the first and second ports in cooperation with the first land, a third land selectively enabling communication of the third and fourth ports in cooperation with the second land, and a fourth land receiving the control pressure supplied through the eighth port, wherein the third land and the fourth land are dividedly formed, and wherein an elastic member is disposed between the first land and the valve body.

In a further embodiment, the third and fourth lands are dividedly formed such that the divided position may be placed at the sixth port when the valve spool is moved to the right and at the seventh port when moved to the left.

In a further embodiment, the second clutch control portion includes a second clutch side switching valve and a second clutch side pressure control valve that are controlled by the third proportional control solenoid valve such that a hydraulic pressure may be supplied to the second clutch.

In a further embodiment, the second clutch side switching valve includes: a valve body including a first port receiving a control pressure from the third proportional control solenoid valve, a second port disposed opposite to the first port and receiving a reduced pressure of the reducing valve as its control pressure, a third port partially receiving the operating pressure of the second clutch supplied from the second clutch side pressure control valve, and a fourth port supplying the hydraulic pressure selectively received through the third port to the second clutch side pressure control valve as its control pressure; and a valve spool including a first land receiving a control pressure supplied through the first port and a second land receiving a control pressure supplied through the second port and selectively enabling communication of the third and fourth ports in cooperation with the first land, wherein the first land is provided with an elastic member forming an elastic force that always biases the valve spool to the left in the drawing.

In a further embodiment, the second clutch side pressure control valve includes: a valve body including a first port receiving a control pressure from the third proportional control solenoid valve, a second port receiving a control pressure from the second clutch side switching valve, a third port receiving the line pressure, a fourth port supplying the hydraulic pressure received through the third port to the second clutch, and a fifth port exhausting the hydraulic pressure supplied through the fourth port; and a valve spool including a first land receiving the control pressure supplied through the first port, a second land selectively opening/closing the fifth port, and a third land selectively enabling communication of the fourth port to the third and fifth ports in cooperation with the second land, wherein an elastic member is disposed between the third land and the valve body.

In a further embodiment, the second brake control portion includes a second brake side switching valve and a second brake side pressure control valve that are controlled by a fourth proportional control solenoid valve such that the second brake may receive an hydraulic pressure.

In a further embodiment, the second brake side switching valve includes: a valve body including a first port receiving a control pressure from the fourth proportional control solenoid valve, a second port disposed opposite to the first port and receiving a reduced pressure of the reducing valve as its control pressure, a third port partially receiving the operating pressure of the second brake supplied from the second brake side pressure control valve, and a fourth port supplying the hydraulic pressure of the third port to the second brake side pressure control valve as its control pressure; and a valve spool including a first land receiving the control pressure supplied from the first port and a second land receiving the control pressure supplied through the second port and selectively enabling communication of the third and fourth ports in cooperation with the first land, wherein the first land is provided with an elastic member forming an elastic force that always biases the valve spool to the left in the drawing.

In a further embodiment, the second brake side pressure control valve includes: a valve body including a first port receiving a control pressure from the fourth proportional control solenoid valve, a second port receiving a control pressure from the second brake side switching valve, a third port receiving the line pressure, a fourth port supplying the hydraulic pressure received through the third port to the second brake, a fifth port exhausting the hydraulic pressure supplied through the fourth port, and a sixth port communicating with the second port of the second switching valve; and a valve spool including a first land receiving the control pressure supplied through the first port, a second land selectively opening/closing the fifth port, a third land selectively enabling communication of the fourth port to the third and fifth ports in cooperation with the second land, and a fourth land receiving the control pressure supplied through the second port, wherein an elastic member is disposed between the fourth land and the valve body.

In a further embodiment, the first switching valve is connected to an upstream side of the second clutch and the second brake interposing a second shuttle valve, such that the hydraulic pressure supplied to the second clutch and the second brake may partially be supplied to the first switching valve.

In a further embodiment, the fourth clutch control portion includes a fourth clutch side switching valve and a fourth clutch pressure control valve that are controlled by a fifth proportional control solenoid valve such that the second brake may receive an hydraulic pressure.

In a further embodiment, the fourth clutch side switching valve includes: a valve body of the fourth clutch side switching valve including a first port receiving a control pressure from the fifth proportional control solenoid valve, a second port disposed opposite to the first port and receiving the reduced pressure of the reducing valve as its control pressure, a third port partially receiving the operating pressure of the fourth clutch supplied from the fourth clutch side pressure control valve, and a fourth port supplying the hydraulic pressure selectively received through the third port to the fourth clutch side pressure control valve as its control pressure; and a valve spool including a first land receiving the control pressure of the first port, and a second land receiving the control pressure supplied through the second port and enabling selective communication of the third and fourth ports and in cooperation with the first land, wherein an elastic member is disposed between the first land and the valve body.

In a further embodiment, the fourth clutch pressure control valve includes: a valve body of the fourth clutch pressure control valve including a first port receiving a control pressure from the fifth proportional control solenoid valve, a second port receiving a control pressure the fourth clutch switching valve, a third port receiving the line pressure, a fourth port supplying the hydraulic pressure received through the third port to the fourth clutch, and a fifth port exhausting the hydraulic pressure supplied through the fourth port; and a valve spool including a first land receiving the control pressure supplied through the first port, a second land selectively opening/closing the fifth port, and a third land enabling selective communication of the fourth port to the third and fifth ports in cooperation with the second land, wherein an elastic member is disposed between the third land and the valve body.

BRIEF DESCRIPTION OF THE DRAWINGS

FIG. 2 is an operational chart for frictional members of a powertrain shown in FIG. 1.

DETAILED DESCRIPTION OF THE EMBODIMENTS

Embodiments of the present invention will hereinafter be described in detail with reference to the accompanying drawings.

Figure 1:
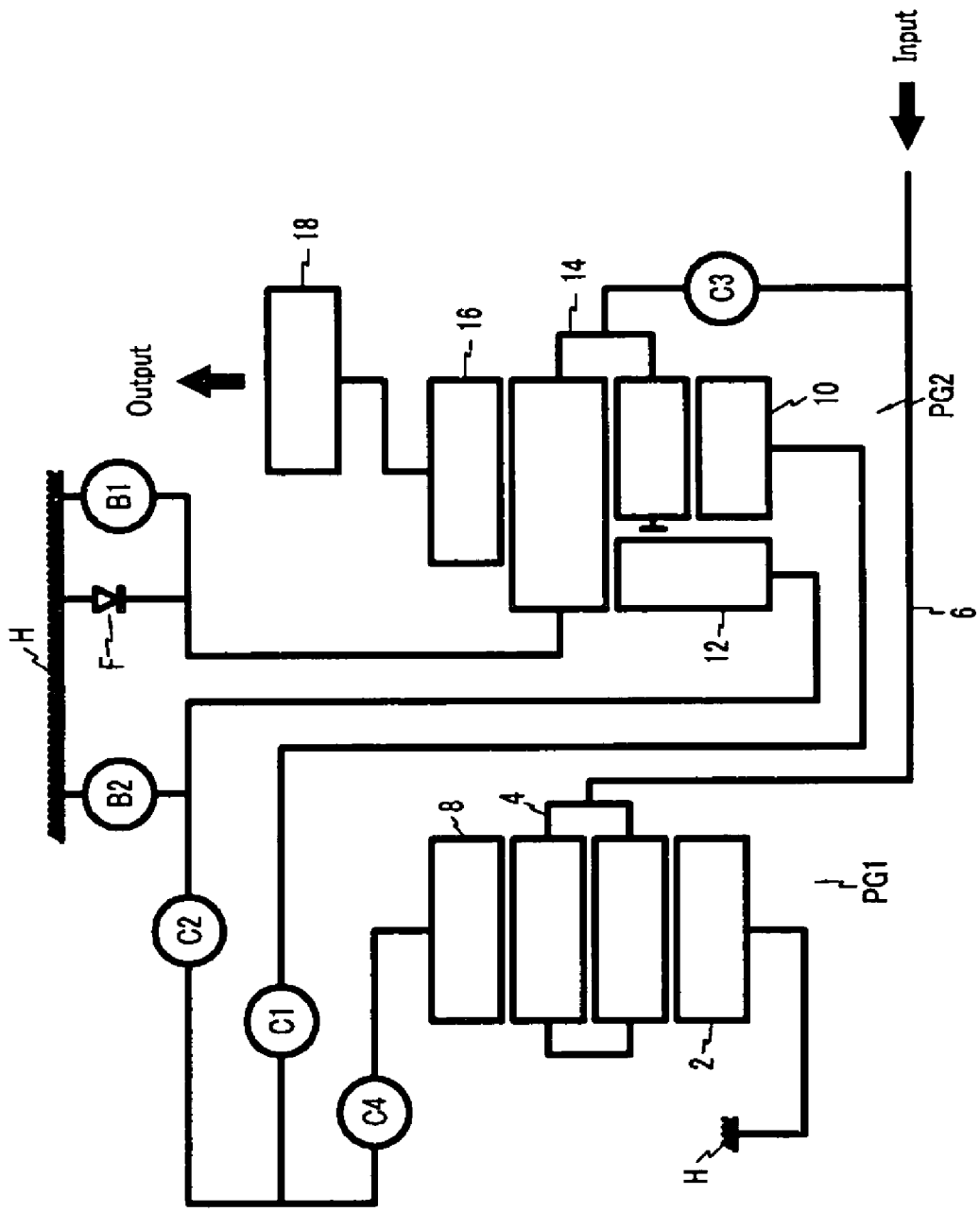
FIG. 1 is a schematic diagram of an exemplary powertrain that may be operated by a hydraulic control system according to an exemplary embodiment of the present invention.

As shown in FIG. 1, an exemplary seven-speed powertrain that may be operated by a hydraulic control system according to an exemplary embodiment of the present invention is formed of a first planetary gear set PG1 of a double pinion planetary gear set and a second planetary gear set PG2 of a Ravingneaux type compound planetary gear set PG2. The first and second planetary gear sets PG1 and PG2 are combined by four clutches C1, C2, C3, and C4 and two brakes B1 and B2.

A sun gear 2 of the first planetary gear set PG1 is fixedly connected to a transmission housing H so as to always act as a reaction element, and a planet carrier 4 thereof is directly connected with an input shaft 6 so as to always act as an input element.

A ring gear 8 of the first planetary gear set PG1 always acts as an output element of the first planetary gear set PG1. The output of the ring gear 8 is bifurcated after passing through a fourth clutch C4. That is, commonly interposing a fourth clutch C4, the ring gear 8 is connected to a first sun gear 10 of the second planetary gear set PG2 via a first clutch c1, and also to a second sun gear 12 of the second planetary gear set PG2 via a second clutch C2.

A planet carrier 14 of the second planetary gear set PG2 is variably connected to an input shaft 6 via a third clutch C3, and also variably connected to the transmission housing H interposing a first brake B1. A one-way clutch F is arranged in parallel with the first brake between the transmission housing H and.

In addition, the transmission housing H is connected to a member connecting the second clutch C2 and the second sun gear 12 of the second planetary gear set PG2, interposing a second brake B2. A ring gear 16 of the second planetary gear set PG2 is connected with an output gear 16 so as to always act as an output element.

Such a structured powertrain may be operated according to an operational chart shown in FIG. 2 to achieve seven forward speeds and one reverse speed. That is, the first and fourth clutches C1 and C4 are operated for the first forward speed. The first and fourth clutches C1 and C4 and the second brake B2 are operated for the second forward speed. The first, second, and fourth clutches C1, C2, and C4 are operated for the third forward speed. The first, third, and fourth clutches C1, C3, and C4 are operated for the fourth forward speed. The first, second, and third clutches C1, C2, and C3 are operated for the fifth forward speed. The second, third, and fourth clutches C2, C3, and C4 are operated for the sixth forward speed. The third and fourth clutches C3 and C4 and the second brake B2 are operated for the seventh forward speed. The second and fourth clutches C2 and C4 and the first brake B1 are operated for the reverse speed.

A shifting operation formed by operating the frictional elements according to the operational chart shown in FIG. 2 will be understood by a person of an ordinary skill in the art based on the teachings set forth herein and thus need not be described in further detail.

Figure 3:
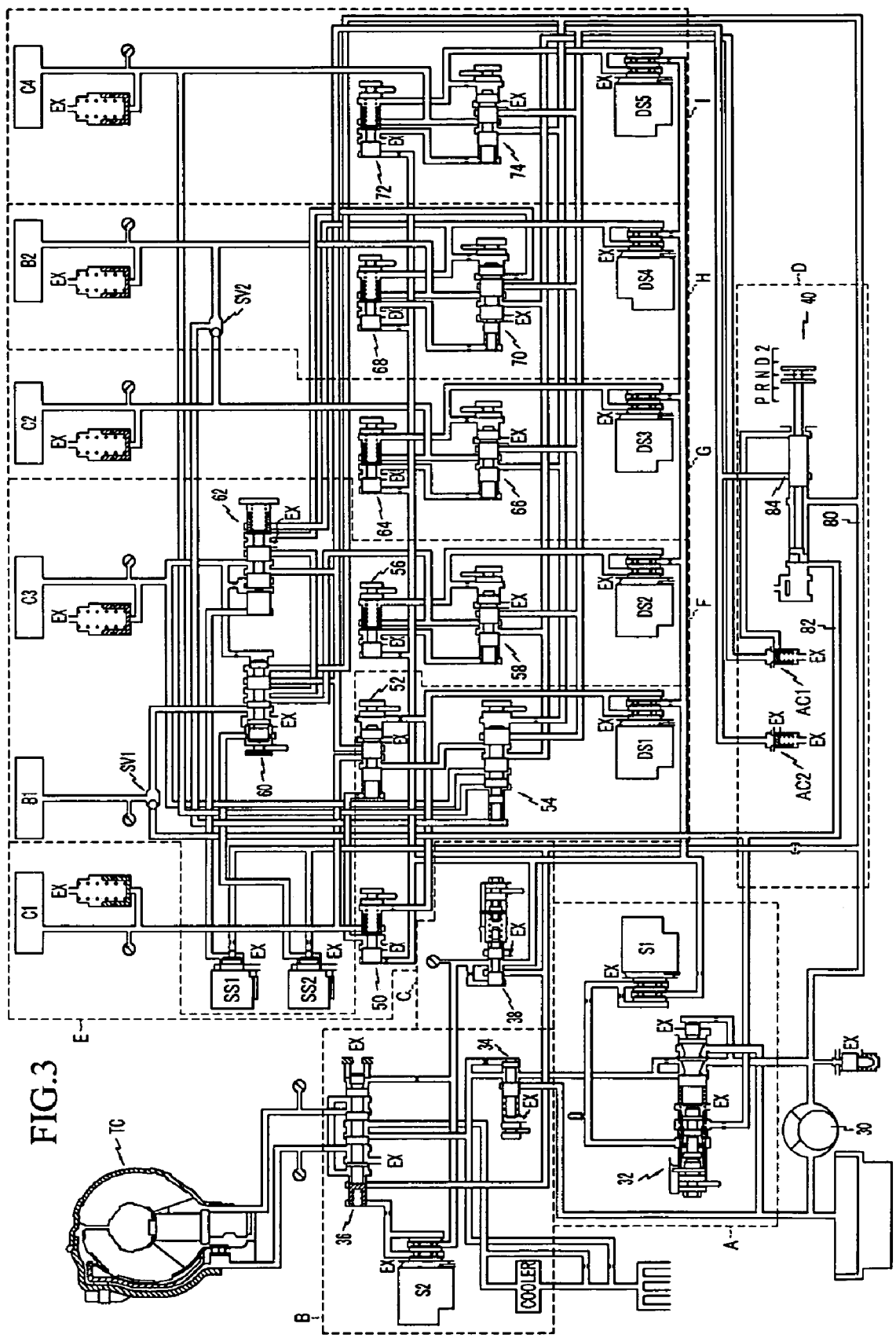
FIG. 3 is a schematic diagram of a hydraulic control system according to an exemplary embodiment of the present invention.

As a hydraulic control system for operating such a powertrain, as shown in FIG. 3, a hydraulic control system according to an exemplary embodiment of the present invention includes a line pressure control portion A, a launch control portion B, a pressure reduction control portion C, a manual shift control portion D, a first clutch control portion E, a first brake and third clutch control portion F, a second clutch control portion G, a second brake control portion H, and a fourth clutch control portion I, so as to control supply and release of hydraulic pressure to the friction members C1, C2, C3, C4, B1, and B2.

The line pressure control portion A, the launch control portion B, and the pressure reduction control portion C may be formed according to a conventional scheme. According to an exemplary embodiment of the present invention, the line pressure control portion A includes a regulator valve 32 and a proportional control solenoid valve S1 controlling the same. Therefore, the hydraulic pressure supplied from a hydraulic pump 30 may be controlled to be stable and a line pressure may be varied according to driving conditions. Therefore, fuel consumption of a vehicle may be enhanced.

The launch control portion B includes a torque converter control valve 34, a damper clutch control valve 36, and a proportional control solenoid valve S2. The torque converter control valve 34 reduces the line pressure in order to properly control a damper clutch for an enhancement of fuel consumption at high speed and to utilize a torque multiplication effect of a torque converter TC under acceleration. The damper clutch control valve 36 controls engagement and release of the damper clutch. The proportional control solenoid valve S2 controls the damper clutch control valve 36 according to an electrical signal from a transmission control unit (TCU). The TCU may include a processor, memory and associated hardware, software and/or firmware as may be selected and programmed by a person of ordinary skill based on the teachings herein contained.

The pressure reduction control portion C includes a reducing valve 38. The pressure reduction control portion C reduces the hydraulic pressure supplied from the hydraulic pump 30 and then supplies the reduced pressure to solenoid valves S1 and S2 as their control pressures, and also to respective clutch/brake control portions as their control pressures.

The manual shift control portion D includes a manual valve 40 that enables conversion of hydraulic lines according to a manual shifting.

The first clutch control portion E includes a first clutch side switching valve 50, a first clutch side pressure control valve 52 and a first switching valve 54. The first clutch side switching valve 50 and the first clutch side pressure control valve 52 are controlled by a first proportional control solenoid valve DS1. The first switching valve 54 controls an operating pressure of the first clutch C1 in response to control pressure of the line pressure and a hydraulic pressure from the second clutch C2 or the second brake B2.

The first brake and third clutch control portion F includes a third clutch side switching valve 56, a third clutch side pressure control valve 58, a control valve 60, a second switching valve 62, and first and second on/off solenoid valves SS1 and SS2. The third clutch side switching valve 56 and the third clutch side pressure control valve 58 are controlled by a second proportional control solenoid valve DS2. The control valve 60 enables hydraulic line conversion of hydraulic pressure supplied from the third clutch side pressure control valve 58. The second switching valve 62 supplies the hydraulic pressure supplied from the control valve 60 to the third clutch C3. The first and second on/off solenoid valves SS1 and SS2 control the second switching valve 62 and the control valve 60.

The second clutch control portion G includes a second clutch side switching valve 64 and a second clutch side pressure control valve 66 that are controlled by a third proportional control solenoid valve DS3.

The second brake control portion H includes a second brake side switching valve 68 and a second brake side pressure control valve 70 that are controlled by a fourth proportional control solenoid valve DS4.

In addition, the fourth clutch control portion I includes a fourth clutch side switching valve 72 and a fourth clutch pressure control valve 74 that are controlled by a fifth proportional control solenoid valve DS5.

In more detail, as shown in FIG. 3, the manual valve 40 supplies the hydraulic pressure, supplied from a line pressure line 80 connected to the regulator valve 32, selectively to a reverse range pressure line 82 and a forward range pressure line 84 according to a change in drive ranges.

The reverse range pressure line 82 is connected to the regulator valve 32 so as to control the line pressure in the reverse R range and is also connected to the first brake B1 so as to supply a reverse range pressure thereto.

The forward range pressure line 84 is arranged to be capable of supplying operating pressure to respective control portions controlling friction members.

Figure 4:
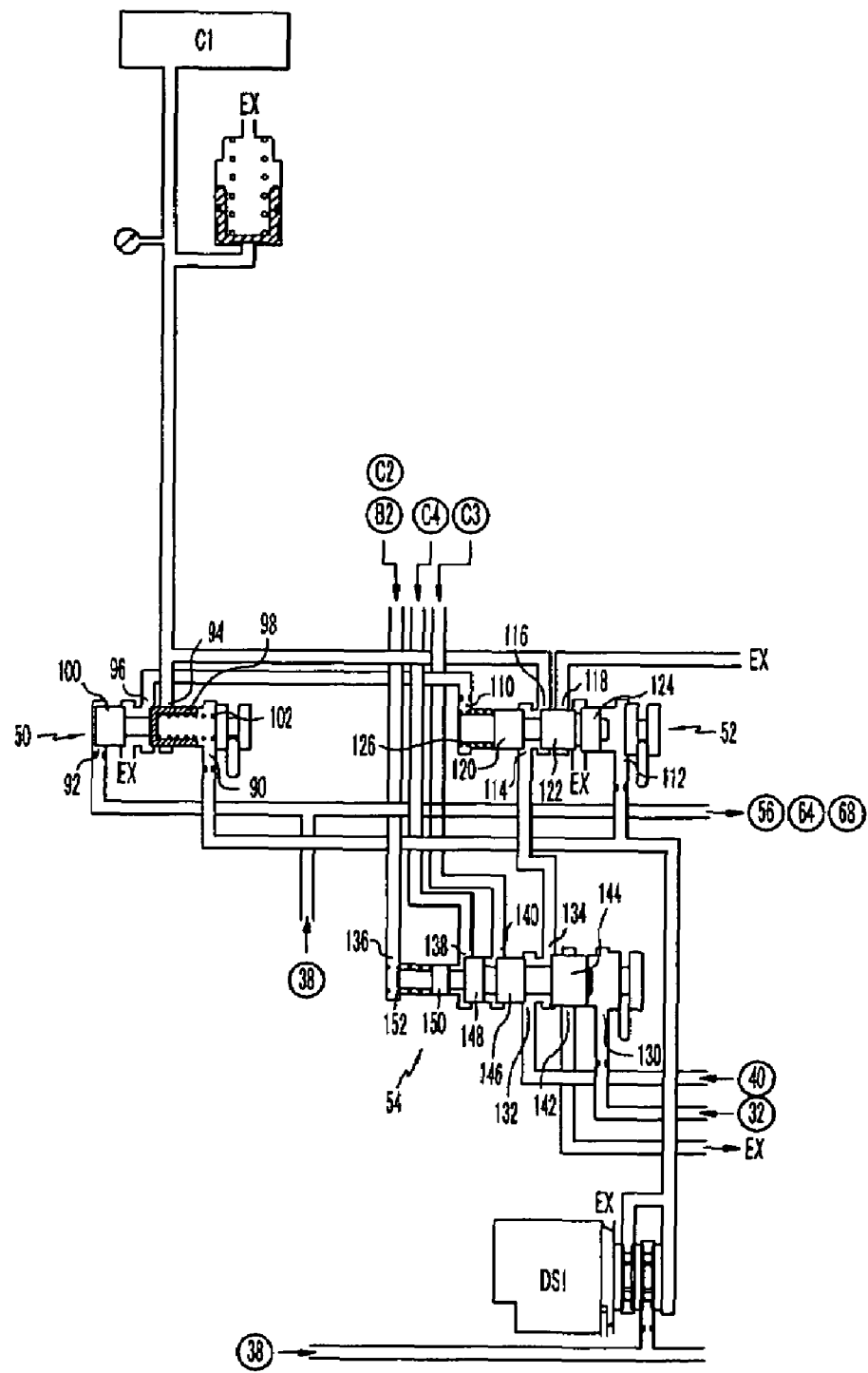
FIG. 4 is detailed diagram of a first clutch control portion according to an exemplary embodiment of the present invention.

FIG. 4 is a detailed diagram of an exemplary first clutch control portion E. The first clutch side switching valve 50 includes a valve body and a valve spool installed therein.

The valve body of the first clutch side switching valve 50 includes first to fourth ports 90, 92, 94 and 96. The first port 90 receives a control pressure from the first proportional control solenoid valve DS1. The second port 92 is formed at an opposite side of the first port 90 and receives a reduced pressure of the reducing valve 38 as its control pressure. The third port 94 partially receives the operating pressure supplied to the first clutch C1. The fourth port 96 selectively supplies the hydraulic pressure received through the third port 94 to the first clutch side pressure control valve 52 as a control pressure thereof.

The valve spool installed in the valve body of first clutch side switching valve 50 includes first and second lands 98 and 100. The first land 98 receives the control pressure supplied from the first port 90. The second land 100 receives the control pressure supplied through the second port 92 and selectively enables communication of the third and fourth ports 94 and 96, cooperatively with the first land 98. The first land 98 is provided with an elastic member 102 forming an elastic force that always biases the valve spool to the left in the drawing.

By the reduced pressure supplied through the second port 92, the valve spool moves to the right in the drawing such that the third and fourth ports 94 and 96 may communicate with each other. When a duty control pressure of the first proportional control solenoid valve DS1 is supplied through the first port 90, the valve spool moves to the left in the drawing by an amount corresponding to the duty control pressure. In this case, a cross-sectional area of the communication passage between the third and fourth ports 94 and 96 is accordingly adjusted, thereby adjusting the control pressure supplied to the first clutch side pressure control valve 52.

The first clutch side pressure control valve 52 includes a valve body and a valve spool installed therein.

The valve body of the first clutch side pressure control valve 52 includes first to fifth ports 110, 112, 114, 116 and 118. The first port 110 receives a control pressure from the first clutch side switching valve 50. The second port 112 receives a control pressure from the first proportional control solenoid valve DS1. The third port 114 receives an operating pressure of the first clutch C1 supplied from the first switching valve 54. The fourth port 116 selectively supplies the hydraulic pressure received through the third port 114 to the first clutch C1. The fifth port 118 returns the hydraulic pressure received through the fourth port 116.

The valve spool of the first clutch side pressure control valve 52 includes first to third lands 120, 122 and 124. The first land 120 selectively closes the third port 114 by the control pressure received through the first port 110. The second land 122 enables communication of the third and fourth ports 114 and 116 or the fourth and fifth ports 116 and 118, in cooperation with the first land 120. The third land 124 receives the control pressure supplied through the second port 112. In addition, an elastic member 126 is disposed between the first land 120 and the valve body.

When a control pressure is supplied through the first port 110, the valve spool moves to the right in the drawing and thereby closes the third port 114 and enables communication of the fourth and fifth ports 116 and 118. When the duty control pressure of the first proportional control solenoid valve DS1 is supplied through the second port 112, the valve spool moves to the left in the drawing by an amount corresponding to the duty control pressure, thereby communicating the third and fourth ports 114 and 116.

The first switching valve 54 includes a valve body and a valve spool installed therein. The valve body of the first switching valve 54 includes first to sixth ports 130, 132, 134, 136, 138, 140, and 142. The first port 130 receives a forward range pressure as its control pressure. The second port 132 receives the line pressure. The third port 134 supplies the hydraulic pressure received through the second port 132 to the first clutch side pressure control valve 52. The fourth port 136 receives the operating pressures of the second clutch C2 and the second brake B2 as its control pressure. The fifth port 138 receives the operating pressure of the fourth clutch C4 as its control pressure. The sixth port 140 receives the operating pressures of the third clutch C3 as its control pressure. The seventh port 142 exhausts the hydraulic pressure supplied through the third port 134.

The valve spool installed in the valve body of the first switching valve 54 includes first to fourth lands 144, 146, 148, and 150. The first land 144 receives the control pressure supplied through the first port 130. The second land 146 receives the hydraulic pressure supplied through the sixth port 140 and selectively enables communication of the third port 134 to the first and sixth ports 130 and 142, in cooperation with the first land 144. The third land 148 receives the control pressure supplied through the fifth port 138. The fourth land 150 receives the control pressure supplied through the fourth port 136. In addition, an elastic member 152 is disposed between the fourth land 150 and the valve body.

The first switching valve 54 is structured such that, while the control pressure is supplied through the first port 130, the valve spool does not move toward the first port 130 if a control pressure is not supplied through any of the fourth, fifth, and sixth ports 136, 138, and 140.

Figure 5:
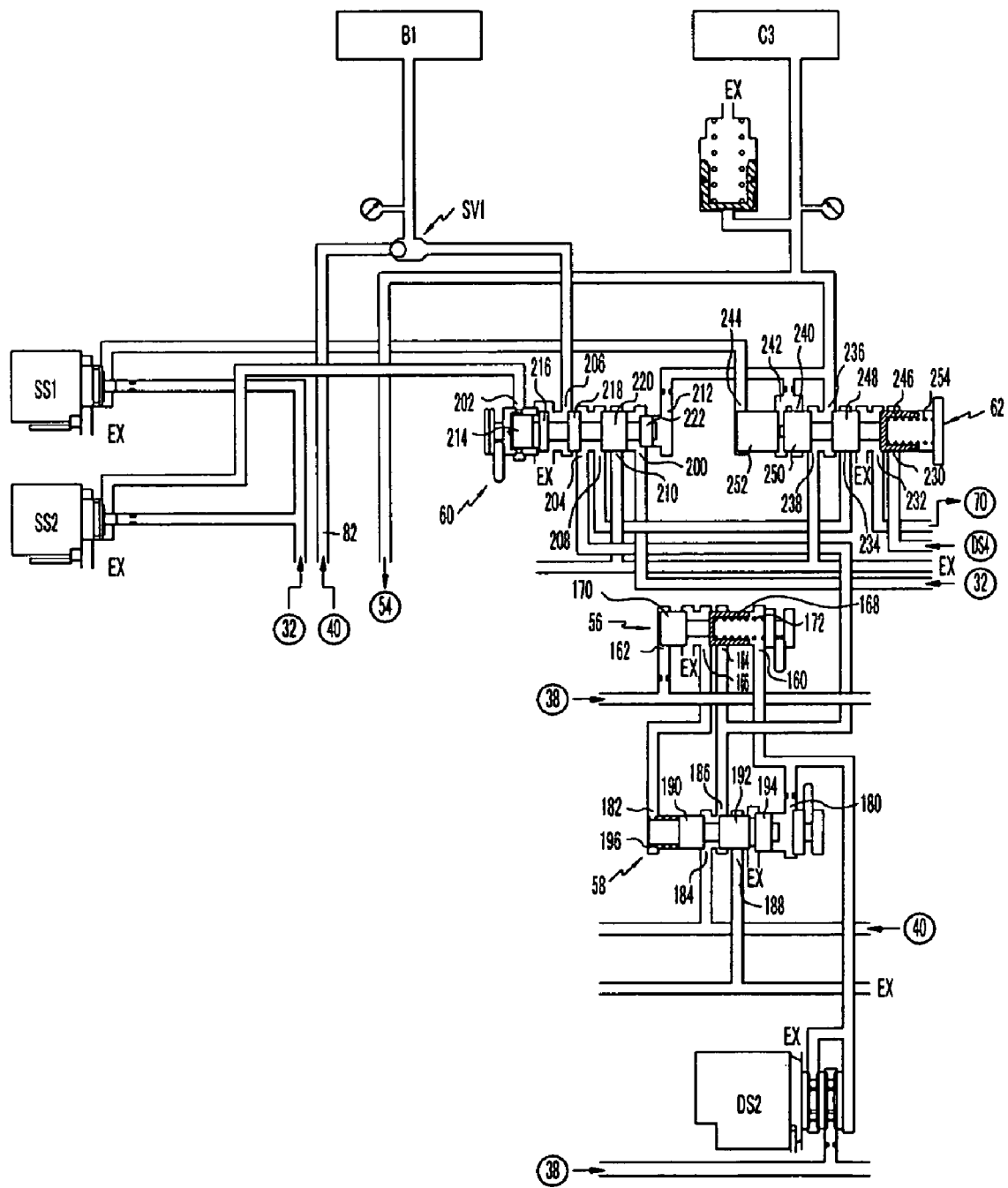
FIG. 5 is detailed diagram of a first brake and third clutch control portion according to an exemplary embodiment of the present invention.

FIG. 5 is a detailed diagram of an exemplary first brake and third clutch control portion F. The third clutch side switching valve 56 includes a valve body and a valve spool installed therein.

The valve body of the third clutch side switching valve 56 includes first to fourth ports 160, 162, 164 and 166. The first port 160 receives a control pressure from the second proportional control solenoid valve DS2. The second port 162 is formed at an opposite side of the first port 160 and receives a reduced pressure of the reducing valve 38 as its control pressure. The third port 164 partially receives the operating pressure supplied to the first brake B1 or the third clutch C3. The fourth port 166 selectively supplies the hydraulic pressure received through the third port 164 to the third clutch side pressure control valve 58 as a control pressure thereof.

The valve spool installed in the valve body of the third clutch side switching valve 56 includes first and second lands 168 and 170. The first land 168 receives the control pressure supplied from the first port 160. The second land 170 receives the control pressure supplied through the second port 162 and selectively enables communication of the third and fourth ports 164 and 166. The first land 168 is provided with an elastic member 172 forming an elastic force that always biases the valve spool to the left in the drawing.

By the reduced pressure supplied through the second port 162, the valve spool moves to the right in the drawing such that the third and fourth ports 164 and 166 may communicate with each other. When a duty control pressure of the second proportional control solenoid valve DS2 is supplied through the first port 160, the valve spool moves to the left in the drawing by an amount corresponding to the duty control pressure. In this case, a cross-sectional area of the communication passage between the third and fourth ports 164 and 166 is accordingly adjusted, thereby adjusting the control pressure supplied to the third clutch side pressure control valve 58.

The third clutch side pressure control valve 58 includes a valve body and a valve spool installed therein. The valve body of the third clutch side pressure control valve 58 includes first to fifth ports 180, 182, 184, 186 and 188. The first port 180 receives a control pressure from the second proportional control solenoid valve DS2. The second port 182 receives a control pressure from the third clutch side switching valve 56. The third port 184 receives the forward range pressure from the manual valve 40. The fourth port 186 supplies the hydraulic pressure received through the third port 184 to the control valve 60 and the third clutch side switching valve 56. The fifth port 188 returns the hydraulic pressure received through the fourth port 186.

The valve spool of the third clutch side pressure control valve 58 includes first to third lands 190, 192, and 194. The first land 190 selectively closes the third port 184 by the control pressure received through the second port 182. The second land 192 enables communication of the third and fourth ports 184 and 186 or the fourth and fifth ports 186 and 188, cooperatively with the first land 190. The third land 194 receives the control pressure supplied through the second port 182. In addition, an elastic member 196 is disposed between the first land 190 and the valve body.

When a control pressure is supplied through the first port 180, the valve spool moves to the right in the drawing and thereby closes the third port 184 and enables communication of the fourth and fifth ports 186 and 188. When the duty control pressure of the second proportional control solenoid valve DS2 is applied through the first port 180, the valve spool moves to the left in the drawing by an amount corresponding to the duty control pressure and the third and fourth ports 184 and 186 communicate with each other.

The control valve 60 includes a valve body and a valve spool installed therein. The valve body of the control valve 60 includes first to seventh ports 200, 202, 204, 206, 208, 210, and 212. The first port 200 receives the line pressure. The second port 202 receives a control pressure from the second on/off solenoid valve SS2. The third port 204 receives a hydraulic pressure from the third clutch side pressure control valve 58. The fourth port 206 supplies the hydraulic pressure received through the third port 204 to the first brake B1 as an operating pressure thereof. The fifth port 208 supplies the hydraulic pressure received through the third port 204 to the second switching valve 62. The sixth port 210 exhausts the hydraulic pressure supplied through the fifth port 208. The seventh port 212 receives an operating pressure from the third clutch C3 as its control pressure.

The valve spool installed in the valve body of the control valve 60 includes first to fifth lands 214, 216, 218, 220, and 222. The first land 214 receives a control pressure supplied through the second port 202. The second land 216 selectively enables communication of the fourth port 206 to an exhaust port EX. The third land 218 selectively enables communication of the third port 204 to the fourth and fifth ports 206 and 208. The fourth land 220 selectively opens the fifth port 208 by the control pressure supplied through the first port 200. The fifth land 222 receives the control pressure supplied through the seventh port 212.

When a hydraulic pressure is supplied through the second port 202, the valve spool moves to the right in the drawing and accordingly the third and fourth ports 204 and 206 communicate with each other. When hydraulic pressure is not supplied through the second port 202 the valve spool moves to the left in the drawing by the hydraulic pressure supplied through the first port 200 and accordingly the third and fifth ports 204 and 208 communicate with each other.

In addition, a first shuttle valve SV1 is disposed to an upstream side of the first brake B1 such that the first brake B1 may receive the forward range pressure in a low L range where the engine brake is activated and receive the reverse range pressure in the reverse range.

The second switching valve 62 includes a valve body and a valve spool installed therein. The valve body of the second switching valve 62 includes first to eighth ports 230, 232, 234, 236, 238, 240, 242, and 244. The first port 230 receives a control pressure from the fourth proportional control solenoid valve DS4. The second port 232 supplies the control pressure received through the first port 230 to the second brake side pressure control valve 70. The third port 234 receives a hydraulic pressure from the control valve 60 as an operating pressure for the third clutch C3. The fourth port 236 supplies the hydraulic pressure received through the third port 234 to the third clutch C3. The fifth port 238 exhausts the hydraulic pressure supplied through the fourth port 236. The sixth and seventh ports 240 and 242 are bifurcated from the fourth port 236 and utilize the hydraulic pressure output from the fourth port 236 as a control pressure of the second switching valve 62. The eighth port 244 receives a control pressure from the first on/off solenoid valve SS1.

The valve spool installed in the valve body of the second switching valve 62 includes first to fourth lands 246, 248, 250 and 252. The first land 246 selectively opens the first port 230. The second land 248 selectively enables communication of the first and second ports 230 and 232, cooperatively with the first land 246. The third land 250 selectively enables communication of the third and fourth ports 234 and 236, cooperatively with the second land 248. The fourth land 252 receives the control pressure supplied through the eighth port 244. The third land 250 and the fourth land 252 are dividedly formed. In addition, an elastic member 254 is disposed between the first land 246 and the valve body.

The third and fourth lands 250 and 252 are dividedly formed such that the divided position may be placed at the sixth port 240 when the valve spool is moved to the right and at the seventh portion 242 when moved to the left.

Therefore, while the third clutch C3 is receiving an operating pressure, the valve spool 62 may remain moved to the right against the case of malfunction of the first on/off solenoid valve SS1.

When a control pressure is supplied from the first on/off solenoid valve SS1, the valve spool moves to the right in the drawing such that the hydraulic pressure received through the third port 234 may be supplied to the third clutch C3 through the fourth port 236.

According to such a scheme, at the seventh forward speed, the control pressure of the fourth proportional control solenoid valve DS4 is supplied to the second brake side pressure control valve 70 such that the valve spool may move to the right in the drawing. That is, the second brake B2 may be controlled by different control routes at low and high gears, such that a precise control thereof may be enabled.

Figure 6:
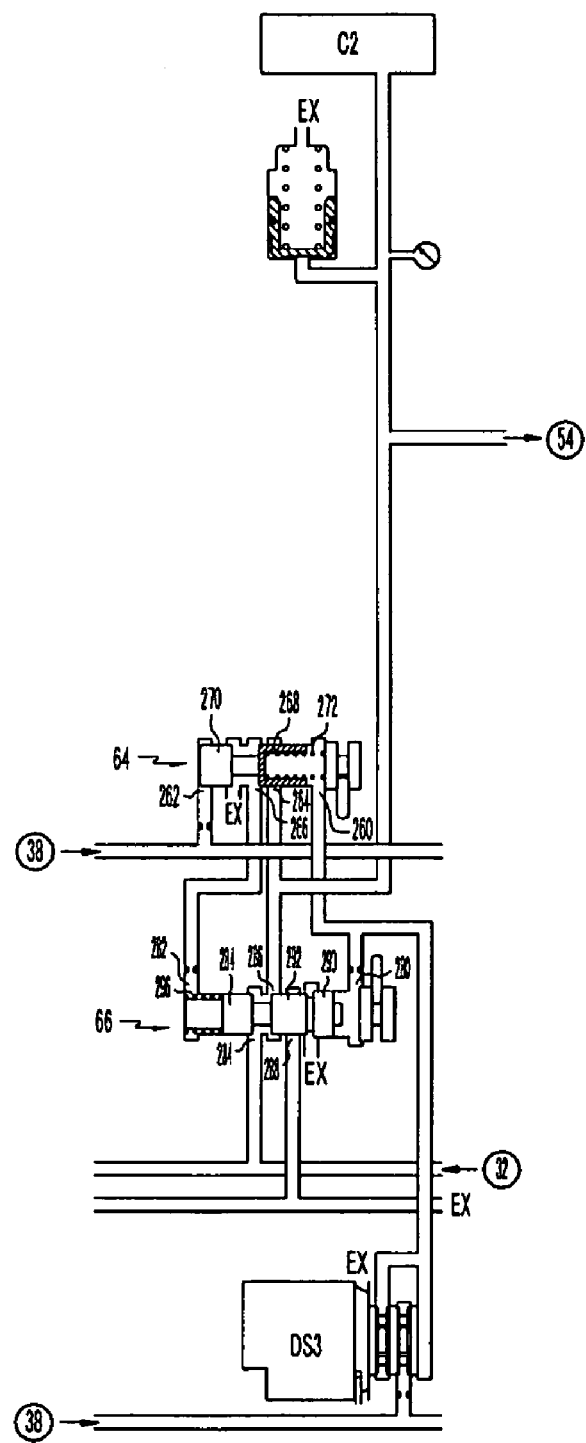
FIG. 6 is detailed diagram of a second clutch control portion according to an exemplary embodiment of the present invention.

FIG. 6 is a detailed diagram of an exemplary second clutch control portion G. The second clutch side switching valve 64 includes a valve body and a valve spool installed therein.

The valve body of the second clutch side switching valve 64 includes first to fourth ports 260, 262, 264, and 266. The first port 260 receives a control pressure from the third proportional control solenoid valve DS3. The second port 262 is disposed opposite to the first port 260 and receives a reduced pressure of the reducing valve 38 as its control pressure. The third port 264 partially receives the operating pressure of the second clutch C2 supplied from the second clutch side pressure control valve 66. The fourth port 266 supplies the hydraulic pressure selectively received through the third port 264 to the second clutch side pressure control valve 66 as its control pressure.

The valve spool installed in the valve body of the second clutch side switching valve 64 includes first and second lands 268 and 270. The first land 268 receives a control pressure supplied through the first port 260. The second land 270 receives a control pressure supplied through the second port 262 and selectively enables communication of the third and fourth ports 264 and 266, cooperatively with the first land 268. The first land 268 is provided with an elastic member 272 forming an elastic force that always biases the valve spool to the left in the drawing.

Without a duty control pressure, the valve spool is moved to the right in the drawing by the control pressure supplied through the second port 262 and accordingly the third and fourth ports 264 and 266 communicate with each other. When a duty control pressure of the third proportional control solenoid valve DS3 is received through the first port 260, the valve spool moves to the left in the drawing by an amount corresponding to the duty control pressure and the third port 264 is closed correspondingly.

The second clutch side pressure control valve 66 includes a valve body and a valve spool installed therein. The valve body of the second side clutch pressure control valve 66 includes first to fifth ports 280, 282, 284, 286, and 288. The first port 280 receives a control pressure from the third proportional control solenoid valve DS3. The second port 282 receives a control pressure from the second clutch side switching valve 64. The third port 284 receives the line pressure. The fourth port 286 supplies the hydraulic pressure received through the third port 284 to the second clutch C2. The fifth port 288 exhausts the hydraulic pressure supplied through the fourth port 286.

The valve spool installed in the valve body of the second clutch side pressure control valve 66 includes first to third lands 290, 292 and 294. The first land 290 receives the control pressure supplied through the first port 280. The second land 292 selectively opens/closes the fifth port 288. The third land 294 selectively enables communication of the fourth port 286 to the third and fifth ports 284 and 288, cooperatively with the second land 292. In addition, an elastic member 296 is disposed between the third land 294 and the valve body.

When a control pressure is supplied through the first port 280, the valve spool is moved to the left in the drawing and enables communication of the third and fourth ports 284 and 286 such that the second clutch C2 is supplied with an operating pressure. When the control pressure of the first port 280 is exhausted and a control pressure is supplied through the second port 282, the valve spool is moved to the right in the drawing such that the operating pressure of the second clutch C2 may be exhausted by the communication of the fourth and fifth ports 286 and 288.

Figure 7:
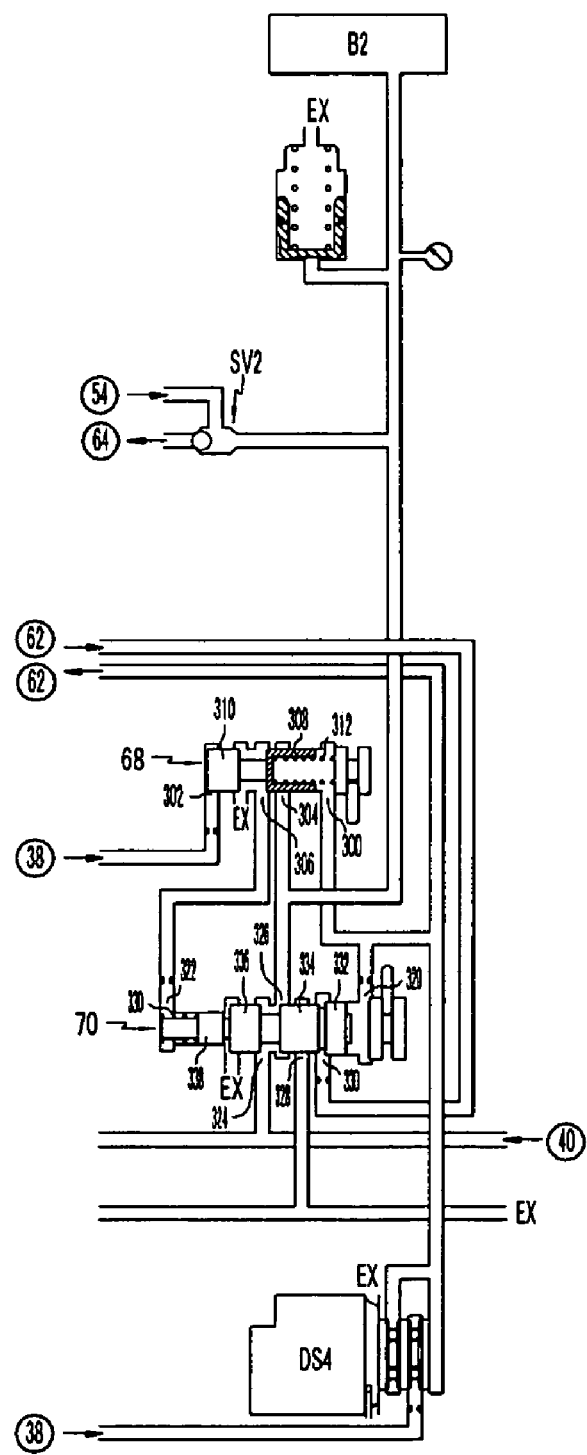
FIG. 7 is detailed diagram of a second brake control portion according to an exemplary embodiment of the present invention.

FIG. 7 is a detailed diagram of an exemplary second brake control portion F. The second brake side switching valve 68 includes a valve body and a valve spool installed therein.

The valve body of the second brake side switching valve 68 includes first to fourth ports 300, 302, 304, and 306. The first port 300 receives a control pressure from the fourth proportional control solenoid valve DS4. The second port 302 is disposed opposite to the first port 300 and receives a reduced pressure of the reducing valve 38 as its control pressure. The third port 304 partially receives the operating pressure of the second brake B2 supplied from the second brake side pressure control valve 70. The fourth port 306 supplies the hydraulic pressure of the third port 304 to the second brake side pressure control valve 70 as its control pressure.

The valve spool installed in the valve body of the second brake side switching valve 68 includes first and second lands 308 and 310. The first land 308 receives the control pressure supplied from the first port 300. The second land 310 receives the control pressure supplied through the second port 302 and selectively enables communication of the third and fourth ports 304 and 306, cooperatively with the first land 308. The first land 308 is provided with an elastic member 312 forming an elastic force that always biases the valve spool to the left in the drawing.

Without a duty control pressure, the valve spool is moved to the right in the drawing by the control pressure supplied through the second port 302 and accordingly the third and fourth ports 304 and 306 communicate with each other. When a duty control pressure of the fourth proportional control solenoid valve DS4 is received through the first port 300, the valve spool moves to the left in the drawing by an amount corresponding to the duty control pressure and the third port 304 is closed correspondingly.

The second brake side pressure control valve 70 includes a valve body and a valve spool installed therein. The valve body of the second brake side pressure control valve 70 includes first to sixth ports 320, 322, 324, 326, 328, and 340. The first port 320 receives a control pressure from the fourth proportional control solenoid valve DS4. The second port 322 receives a control pressure from the second brake side switching valve 68. The third port 324 receives the line pressure. The fourth port 326 supplies the hydraulic pressure received through the third port 324 to the second brake B2. The fifth port 328 exhausts the hydraulic pressure supplied through the fourth port 326. The sixth port 330 communicates with the second port 232 of the second switching valve 62.

The valve spool installed in the valve body of the second brake side pressure control valve 70 includes first to fourth lands 332, 333, 336 and 338. The first land 332 receives the control pressure supplied through the first port 320. The second land 334 selectively opens/closes the fifth port 328. The third land 336 selectively enables communication of the fourth port 326 to the third and fifth ports 324 and 328, cooperatively with the second land 334. The fourth land 338 receives the control pressure supplied through the second port 322. In addition, an elastic member 340 is disposed between the fourth land 338 and the valve body. An elastic member 340 is disposed between the third land 336 and the valve body.

When a control pressure is supplied through the first port 320, the valve spool is moved to the left in the drawing and enables communication of the third and fourth ports 324 and 326 such that the second brake B2 is supplied with an operating pressure. When the control pressure of the first port 320 is exhausted and a control pressure is supplied through the second port 322, the valve spool is moved to the right in the drawing such that the operating pressure of the second brake B2 may be exhausted by the communication of the fourth and fifth ports 326 and 328.

The first switching valve 54 is connected to an upstream side of the two friction members C2 and B2, interposing a second shuttle valve SV2, such that the hydraulic pressure supplied to the second clutch C2 and the second brake B2 may partially be supplied to the first switching valve 54.

Figure 8:
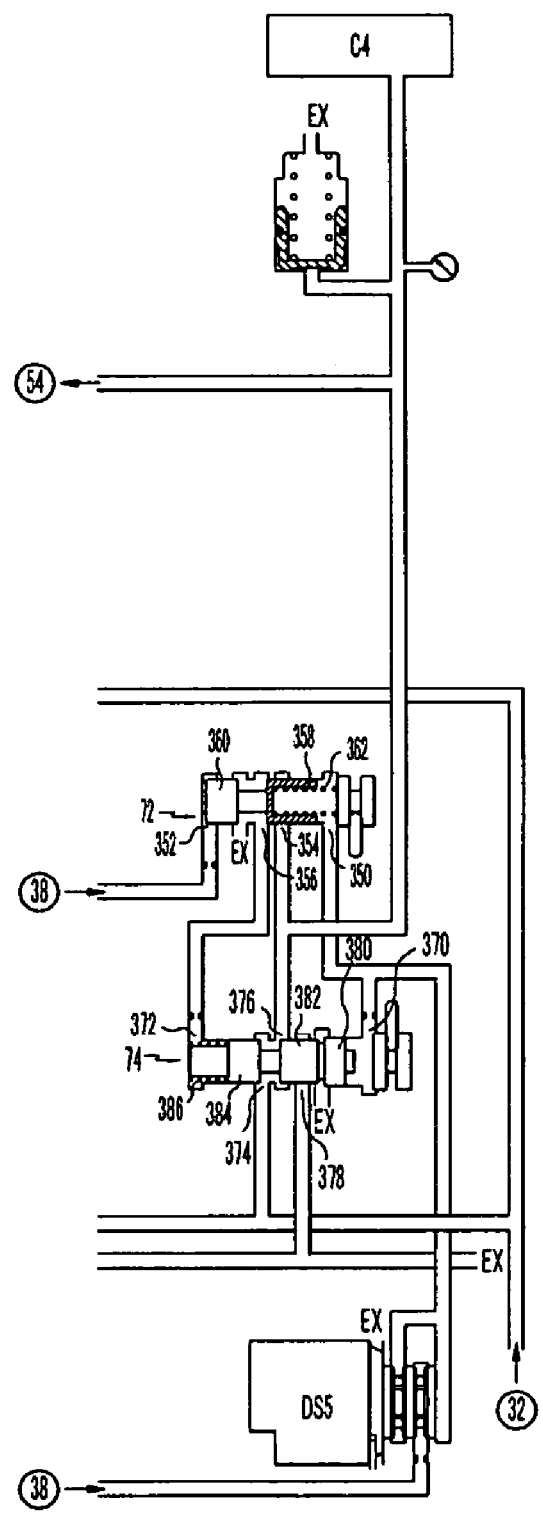
FIG. 8 is detailed diagram of a fourth clutch control portion according to an exemplary embodiment of the present invention.

FIG. 8 is a detailed diagram of an exemplary fourth clutch control portion I. The fourth clutch side switching valve 72 includes a valve body and a valve spool installed therein.

The valve body of the fourth clutch side switching valve 72 includes a first port 350 receiving a control pressure from the fifth proportional control solenoid valve DS5, a second port 352 disposed opposite to the first port 350 and receiving the reduced pressure of the reducing valve 38 as its control pressure, a third port 354 partially receiving the operating pressure of the fourth clutch C4 supplied from the fourth clutch side pressure control valve 74, and a fourth port 356 supplying the hydraulic pressure selectively received through the third port 354 to the fourth clutch side pressure control valve 74 as its control pressure.

The valve spool installed in the valve body includes a first land 358 receiving the control pressure of the first port 350, and a second land 360 receiving the control pressure supplied through the second port 352 and enabling selective communication of the third and fourth ports 354 and 356 in cooperation with the first land.

The first land 358 is provided with an elastic member 362 forming an elastic force that always biases the valve spool to the left in the drawing.

Without a duty control pressure, the valve spool is moved to the right in the drawing by the control pressure supplied through the second port 352 and accordingly the third and fourth ports 354 and 356 communicate with each other. When a duty control pressure of the fifth proportional control solenoid valve DS5 is received through the first port 350, the valve spool moves to the left in the drawing by an amount corresponding to the duty control pressure and the third port 354 is closed correspondingly.

The fourth clutch side pressure control valve 74 includes a valve body and a valve spool installed therein. The valve body of the fourth clutch side pressure control valve 74 includes a first port 370 receiving a control pressure from the fifth proportional control solenoid valve DS3, a second port 372 receiving a control pressure the fourth clutch side switching valve 72, a third port 374 receiving the line pressure, a fourth port 376 supplying the hydraulic pressure received through the third port 374 to the fourth clutch C4, and a fifth port 378 exhausting the hydraulic pressure supplied through the fourth port 376.

The valve spool installed in the valve body includes a first land 380 receiving the control pressure supplied through the first port 370, a second land 382 selectively opening/closing the fifth port 378, and a third land 384 enabling selective communication of the fourth port 376 to the third and fifth port 374 and 378 in cooperation with the second land 382. An elastic member 386 is disposed between the third land 384 and the valve body.

When a control pressure is supplied through the first port 370, the valve spool is moved to the left in the drawing and enables communication of the third and fourth ports 374 and 376 such that the fourth clutch C4 is supplied with an operating pressure. When the control pressure of the first port 370 is exhausted and a control pressure is supplied through the second port 372, the valve spool is moved to the right in the drawing. In this case, the operating pressure of the fourth clutch C4 is exhausted by the communication of the fourth and fifth ports 376 and 378, and the operating pressure is partially supplied to the first switch valve 54 as its control pressure.

In addition, according to an exemplary embodiment of the present invention, an accumulator AC1 is disposed on the drive pressure line 84 such that the drive pressure may be stabilized. Also, an accumulator AC2 is disposed on the return line such that the hydraulic pressure may be stably maintained in the exhaust of the hydraulic pressure. Similarly, an accumulator is respectively disposed on the lines of the first, second, third, and fourth clutches C1, C2, C3 and C4 and the second brake B2 (refer to FIG. 3).

Regarding the first, second, third, fourth, and fifth proportional control solenoid valves DS1, DS2, DS3, DS4, and DS5 applied to the control portions of the exemplary embodiment of the present invention, the first, second, third, and fifth proportional control solenoid valves DS1, DS2, DS3, and DS5 output a maximum hydraulic pressure in a turned-off state and the fourth proportional control solenoid valve DS4 outputs a minimum hydraulic pressure in a turned-off state.

In the hydraulic control system according to an exemplary embodiment of the present invention, the first and second on/off solenoid valves and the proportional control solenoid valve are operated according to the following Table 1 for respective speeds.

TABLE 1

|     | SS1 | SS2  | DS1  | DS2  | DS3  | DS4  | DS5  |
| --- | --- | ---- | ---- | ---- | ---- | ---- | ---- |
| L   | LOW | HIGH | HIGH | HIGH |      |      | HIGH |
| 1st | LOW | LOW  | HIGH |      |      |      | HIGH |
| 2nd | LOW | LOW  | HIGH |      |      | HIGH | HIGH |
| 3rd | LOW | LOW  | HIGH |      | HIGH |      | HIGH |

TABLE 1-continued

|  | SS1 | SS2 | DS1 | DS2 | DS3 | DS4 | DS5 |
|---|---|---|---|---|---|---|---|
| 4th | HIGH | LOW | HIGH | HIGH |  |  | HIGH |
| 5th | HIGH | LOW | HIGH | HIGH | HIGH |  |  |
| 6th | HIGH | LOW |  | HIGH | HIGH |  | HIGH |
| 7th | HIGH | LOW |  | HIGH |  | HIGH | HIGH |
| REV | LOW | LOW |  |  | HIGH |  | HIGH |

Hereinafter, operation of a hydraulic control system according to an exemplary embodiment of the present invention will be described in more detail.

When an engine is started and accordingly hydraulic pressure is generated by the hydraulic pump 30, the line pressure is supplied to the first and second solenoid valves SS1 and SS2, the manual valve 40, the first switching valve 54, the third and fourth clutch side pressure control valves 66 and 74 and the control valve 60. In this case, the hydraulic pressure controlled by the reducing valve 38 is respectively supplied to the proportional control solenoid valves DS1, DS2, DS3, DS4, and DS5, the first, second, third, and fourth clutch side switching valves 50, 64, 56, and 72, and the second brake side switching valve 68 as their control pressures.

When the manual valve 40 is changed to the D range for starting the vehicle, the D range pressure is supplied to the first switching valve 54, the third clutch side pressure control valve 58, and the second brake side pressure control valve 70 through the forward range pressure line 84. In this case, the first switching valve 54 receives the line pressure through its first port 130, such that the valve spool moves to the left in the drawing and thus the second and third ports 132 and 134 communicate with each other. Therefore, the forward range pressure supplied to the second port 132 is delivered to the first clutch side pressure control valve 52 at its third port 114.

As the first proportional control solenoid valve DS1 is duty controlled, the control pressure of the first proportional control solenoid valve DS1 is supplied to the first clutch side switching valve 50 at its first port 90 and also to the first clutch side pressure control valve 52 at its second port 112. Therefore, in this case, their valve spools move to the left in the drawing such that the third port 94 of the first clutch side switching valve 50 is closed, and the third and fourth ports 114 and 116 of the first clutch side pressure control valve 52 communicate with each other. Consequently, the forward range pressure is supplied to the first clutch C1 and shifting to the first forward speed is realized (refer to FIG. 4).

In addition, the hydraulic pressure of the fifth proportional control solenoid valve DS5 is supplied to the fourth clutch side hydraulic pressure control valve 74 at its first port 370. Accordingly, the valve spool moved to the right in the drawing now moves to the left in the drawing by the supplied control pressure. Consequently, the third and fourth ports 374 and 376 communicate with each other, and the hydraulic pressure supplied to the third port 374 is now supplied to the fourth clutch C4 through the fourth port 376.

At the same time, the duty control pressure of the fifth proportional solenoid valve DS5 is also supplied to the fourth clutch side switching valve 72 at its first port 350 as a control pressure. By such a control pressure, the valve spool once moved to the right in the drawing now begins to move to the left.

At this time, the reduced pressure acts on the valve spool at a side opposite to the first port 350 as a control pressure, and therefore, the moving speed of the valve spool is lowered. Accordingly, the operating pressure supplied to the fourth clutch C4 from the fourth clutch side pressure control valve 74 is partially supplied back to the fourth clutch side pressure control valve 74 at its second port 372, through the third and fourth ports 354 and 356. Then, the valve spool moving to the left in the fourth clutch side pressure control valve 74 is slowed, and accordingly the hydraulic pressure supplied to the fourth clutch C4 gradually increases.

When the valve spool of the fourth clutch brake switching valve 72 fully moves to the right, the third port 354 becomes closed. In this case, the control pressure supplied to the fourth clutch side pressure control valve 70 at its second port 372 is now exhausted, and accordingly, the valve spool of the fourth clutch side pressure control valve 74 fully moves to the left in the drawing. Therefore, the forward range pressure is normally supplied to the fourth clutch C4, and thus shifting to the first forward speed realized by the first and fourth clutches C1 and C4 is finished.

When the vehicle speed increases from such state of the first forward speed, the transmission control unit (not shown) starts the duty control of the fourth proportional control solenoid valve DS4 (refer to FIG. 7).

Then, the control duty pressure of the fourth duty solenoid valve DS4 is supplied to the second brake side pressure control valve 70 at its first port 320, and accordingly, the valve spool moved to the right in the drawing now moves to the left by the supplied duty control pressure. Consequently, the third and fourth ports 324 and 326 become to communicate with each other, and the hydraulic pressure supplied to the third port 324 is now supplied to the second brake B2 through the fourth port 326.

At the same time, the duty control pressure of the fourth duty solenoid valve DS4 is also supplied to the second brake side switching valve 68 at its first port 300 as a control pressure. By such a control pressure, the valve spool once moved to the right in the drawing now begins to move to the left.

At this time, the reduced pressure acts on the valve spool at a side opposite to the first port 300 as a control pressure, and therefore, the moving speed of the valve spool is lowered. Accordingly, the operating pressure supplied to the second brake B2 from the second brake side pressure control valve 70 is partially supplied back to the second brake side pressure control valve 70 at its second port 322, through the third and fourth ports 304 and 306. Then, the valve spool moving to the left in the second brake side pressure control valve 70 is slowed, and accordingly the hydraulic pressure supplied to the second brake B2 gradually increases.

When the valve spool of the second brake side switching valve 68 fully moves to the right, the third port 304 becomes closed. In this case, the control pressure supplied to the second brake side pressure control valve 70 at its second port 322 is now exhausted, and accordingly, the valve spool of the second brake side pressure control valve 70 fully moves to the left in the drawing. Therefore, the forward range pressure is normally supplied to the second brake B2, and thus shifting to the second forward speed, realized by the first and fourth clutches C1 and C4 and the second brake B2 is finished.

As can be understood from the above description, the second brake side switching valve 68 and the second brake side pressure control valve 70 cooperatively operate such that the operating pressure supplied to the second brake B2 may be reduced in an early stage of shifting and the operating pressure may normally be supplied at a finishing stage of the shifting. Therefore, the precision of the shift control may be enhanced.

When the vehicle speed further increases from the second forward speed, the transmission control unit turns off the duty control of the fourth proportional control solenoid valve DS4 and then begins the duty control of the third proportional control solenoid valve DS3 (hereinafter, refer to FIG. 6).

Accordingly, the hydraulic pressure supplied to the second brake B2 is exhausted, the duty control pressure of the third proportional control solenoid valve DS3 is supplied to the second clutch side pressure control valve 66 at its first port 280. Accordingly, the valve spool moved to the right in the drawing now moves to the left by the supplied duty control pressure. Consequently, the third and fourth ports 284 and 286 become to communicate with each other, and the hydraulic pressure supplied to the third port 284 is now supplied to the second clutch C2 through the fourth port 286.

At the same time, the duty control pressure of the third proportional control solenoid valve DS3 is also supplied to the second clutch side switching valve 64 at its first port 260 as a control pressure. By such a control pressure, the valve spool once moved to the right in the drawing now begins to move to the left.

At this time, the reduced pressure acts on the valve spool at a side opposite to the first port 260 as a control pressure, and therefore, the moving speed of the valve spool is lowered. Accordingly, the operating pressure supplied to the second clutch C2 from the second clutch side pressure control valve 66 is partially supplied back to the second clutch side pressure control valve 66 at its second port 282, through the third and fourth ports 264 and 266. Then, the valve spool moving to the left in the second clutch side pressure control valve 66 is slowed, and accordingly the hydraulic pressure supplied to the second clutch C2 gradually increases.

When the valve spool of the second clutch side switching valve 64 fully moves to the right, the third port 264 becomes closed. In this case, the control pressure supplied to the second clutch side pressure control valve 66 at its second port 282 is now exhausted, and accordingly, the valve spool of the second clutch side pressure control valve 66 fully moves to the left in the drawing. Therefore, the forward range pressure is normally supplied to the second clutch C2, and thus shifting to the third forward speed, realized by the first, second, and fourth clutches C1, C2, and C4, is finished.

As can be understood from the above description, the second clutch side switching valve 64 and the second clutch side pressure control valve 66 cooperatively operate such that the operating pressure supplied to the second clutch C2 may be reduced in an early stage of shifting and the operating pressure may normally be supplied at a finishing stage of the shifting. Therefore, the precision of the shift control may be enhanced.

When the vehicle speed further increases from the third forward speed, the transmission control unit turns off the duty control of the third proportional control solenoid valve DS3. In addition, it begins the duty control of the second proportional control solenoid valve DS2, and controls the first on/off solenoid valve SS1 to be turned on (hereinafter, refer to FIG. 5).

Accordingly, the hydraulic pressure supplied to the second clutch C2 is exhausted, and the duty control pressure of the second proportional control solenoid valve DS2 is supplied to the third clutch side pressure control valve 58 at its first port 180. Accordingly, the valve spool moved to the right in the drawing now moves to the left by the supplied duty control pressure. Consequently, the third and fourth ports 184 and 186 become to communicate with each other, and the hydraulic pressure supplied to the third port 184 is now supplied to the third port 204 of the control valve 60 through the fourth port 186.

At the same time, the duty control pressure of the second proportional solenoid valve DS2 is also supplied to the third clutch side switching valve 56 at its the first port 160 as a control pressure. By such a control pressure, the valve spool once moved to the right in the drawing now begins to move to the left in the drawing.

At this time, the reduced pressure acts on the valve spool at a side opposite to the first port 160 as a control pressure, and therefore, the moving speed of the valve spool is lowered. Accordingly, the operating pressure supplied to the third clutch C3 from the third clutch side pressure control valve 58 is partially supplied back to the third clutch side pressure control valve 58 at its second port 182, through the third and fourth ports 164 and 166. Then, the valve spool moving to the left in the third clutch side pressure control valve 58 is slowed, and accordingly the hydraulic pressure supplied to the third clutch C3 gradually increases.

When the valve spool of the third clutch side switching valve 56 fully moves to the right, the third port 164 becomes closed. In this case, the control pressure supplied to the third clutch side pressure control valve 58 at its second port 182 is now exhausted, and accordingly, the valve spool of the third clutch side pressure control valve 58 fully moves to the left in the drawing. Therefore, the forward range pressure is normally supplied to the third clutch C3 through the control valve 60 and the second switching valve 62, and thus shifting to the fourth forward speed realized by the first, third, and fourth clutches C1, C3, and C4 is finished.

During such a process of supplying the hydraulic pressure, the control valve 60 receives the line pressure through its first port 200, and accordingly, the valve spool remains moved to the left in the drawing. Therefore, the hydraulic pressure supplied to the third port 204 is output through the fifth port 208 to the third port 234 of the second switching valve 62. At this time, the valve spool of the second switching valve 62 biased to the left by the elastic force of the elastic member 254 receives the control pressure through the eighth port 244 by turning on of the first on/off solenoid valve SS1. Therefore, the valve spool moves to the right in the drawing, such that the hydraulic pressure may be supplied to the third clutch C3 because the third and fourth ports 234 and 236 communicate with each other.

As can be understood from the above description, the hydraulic pressure supplied to the third clutch C3 is partially supplied to the first switching valve 54. In addition, the third clutch side switching valve 56 and the third clutch side pressure control valve 58 cooperatively operates such that the operating pressure supplied to the third clutch C3 may be reduced in an early stage of shifting and the operating pressure may normally be supplied at a finishing stage of the shifting. Therefore, the precision of the shift control may be enhanced.

When the vehicle speed further increases from the fourth forward speed, the transmission control unit turns off the duty control of the fifth proportional control solenoid valve DS5 and then begins the duty control of the third proportional control solenoid valve DS3.

Accordingly, the hydraulic pressure supplied to the fourth clutch C4 are exhausted, while the first and third clutches C1 and C3 remain operating. The duty control pressure of the third proportional control solenoid valve DS3 is supplied to the second clutch side pressure control valve 66 at its first port 280. Accordingly, the valve spool moved to the right in the drawing now moves to the left by the supplied duty control pressure. Consequently, the third and fourth ports 284 and 286 become to communicate with each other, and the hydraulic pressure supplied to the third port 284 is now supplied to the second clutch C2 through the fourth port 286.

When the vehicle speed increases from such state of the fifth forward speed, the transmission control unit (not shown) finishes the duty control of the first duty solenoid valve DS1 and starts the duty control of the fifth proportional control solenoid valve DS5 (refer to FIG. 8).

Then, according to the duty control of the fifth proportional control solenoid valve DS5, the fourth clutch C4 receives the operating pressure in the same way as in the first forward speed, and shifting to the sixth forward speed is realized by the operation of the second, third, and fourth clutches C2, C3, and C4.

When the vehicle speed increases from such state of the sixth forward speed, the transmission control unit (not shown) finishes the duty control of the third duty solenoid valve DS3 and starts the duty control of the fourth proportional control solenoid valve DS4 (refer to FIG. 7).

Then, according to the duty control of the fourth proportional control solenoid valve DS4, the second brake B2 receives the operating pressure in the same way as in the second forward speed, and shifting to the seven forward speed is realized by the operation of the third and fourth clutches C3 and C4 and the second brake B2.

At the reverse speed, the reverse range pressure is directly supplied to the first brake B1 through the reverse range pressure line 82 of the manual valve 40, and at the same time, the duty control of the third and fifth duty solenoid valves DS3 and DS5 is started.

Then, in the same way as in the first and third forward speeds, the first brake B1 and the second and fourth clutches C2 and C4 receive operating pressures, and accordingly shifting to the reverse speed is realized.

During the shifting of the seven forward speeds and the one reverse speed, the hydraulic control system according to an exemplary embodiment of the present invention may provide a fail-safe function in two ways, i.e., against a malfunctioning of an element such as a solenoid valve by a short and/or open circuits.

In more detail, in the case of malfunctioning in the low gears of the first, second, and third forward speeds, the transmission is fixedly operated at the third forward speed. In the case of malfunctioning in the high gears of the fourth, fifth, sixth, and seventh forward speeds, the transmission is fixedly operated at the sixth forward speed.

This is because the first, second, third, and fifth proportional control solenoid valves DS1, DS2, DS3, and DS5 output a maximum amount of hydraulic fluid in the case of the turned-off state, and the fourth proportional control solenoid valve DS4 does not output hydraulic pressure in the case of the turned-off state.

In more detail, when the malfunctioning occurs at the first forward speed where the first and fourth clutches C1 and C4 operate, the second, third, and fifth proportional control solenoid valves DS2, DS3, and DS5 are turned off and output maximum control pressure. Therefore, by the output pressure of the second proportional control solenoid valve DS2, the hydraulic pressure of the third clutch side pressure control valve 58 is supplied to the second switching valve 62 through the control valve 60.

However, since the second switching valve 62 is not supplied with a control pressure, its valve spool remains moved to the left in the drawing. Therefore, the third port 234 is closed and the hydraulic pressure is not supplied to the third clutch C3.

In addition, the hydraulic pressure of the second clutch side pressure control valve 66 is supplied to the second clutch C2 by the output pressure of the third proportional control solenoid valve DS3. Therefore, the third forward speed is fixedly realized by the operation of the first, second, and fourth clutches C1, C2, and C4.

When the malfunctioning occurs at the second forward speed where the first an fourth clutches C1 and C4 and the second brake B2 operate, the third proportional control solenoid valve DS3 is turned off and outputs hydraulic pressure. Accordingly the second clutch C2 is operated, and therefore, the first, the third forward speed is realized by the operation of the first, second, and fourth clutches C1, C2, and C4.

When the malfunctioning occurs at the fourth forward speed where the first, third, and fourth clutches C1, C3, and C4 operate, the hydraulic pressure supplied to the third clutch C3 is partially supplied to the third land 250 of the valve spool through the sixth port 240 even if the first on/off solenoid valve SS1 stops outputting hydraulic pressure. Therefore, the valve spool is prevented from moving left, and accordingly the third clutch C3 continues receiving the hydraulic pressure.

In addition, the second clutch C2 receives the hydraulic pressure since the third proportional control solenoid valve DS3 outputs maximum pressure. Since the hydraulic pressures supplied to the second, third, and fourth clutches C2, C3, and C4 are supplied to the fourth, fifth, and sixth ports 136, 138, and 140 of the first switching valve 54, the second port 132 of the first switching valve 54 is blocked such that the hydraulic pressure supplied to the first clutch C1 is exhausted. Therefore, the sixth forward speed is fixedly realized by the operation of the second, third, and fourth clutches C2, C3, and C4.

When the malfunction occurs at the fifth forward speed where the first, second, and third clutches C1, C2, and C3 operate, the fourth clutch C4 operates by the hydraulic pressure of the fifth proportional control solenoid valve DS5 while the first clutch C1 stops its operation as in the malfunctioning at the fourth forward speed. Therefore, the sixth forward speed is realized by the operation of the second, third, and fourth clutches C2, C3, and C4.

When the malfunctioning occurs at the seventh forward speed where the third and fourth clutches C3 and C4 and the second brake B2 operate, the second clutch C2 receives an operating pressure since the third proportional control solenoid valve DS3 is turned off, and the second brake B2 stops receiving the operating pressure since the fourth proportional control solenoid valve DS4 is turned off. Therefore, the sixth forward speed is fixedly realized by the operation of the second, third, and fourth clutches C2, C3, and C4.

As such, when a malfunctioning occurs while the transmission is driven at high gears such as fourth, fifth, sixth, and seventh speeds, an abrupt downshifting to the third forward speed that may result a shift shock is prevented. When the engine is turned off and then restarted from such a fail-safe mode, the third forward speed is enabled, of course, and thus stronger drive torque than in the sixth forward speed may be achieved.

In addition, regarding the second brake B2, the output pressure of the fourth proportional control solenoid valve DS4 is designed to be supplied to the sixth port 340 of the second brake side pressure control valve 70 through the first and second ports 230 and 232 of the second switching valve 62, such that the hydraulic pressure control valve controlling operational elements may be controlled in different pressure ranges when shifting between high and low gears. Accordingly, the precision of hydraulic pressure control has been enhanced.

In addition, the first brake B1 and the third clutch C3 are controlled by only one pressure control valve (the third clutch side pressure control valve 58 in cooperation with the control valve 60 and the second on/off solenoid valve SS2. Thus, configuration of a hydraulic control system may be simplified.

As described above, an hydraulic control system of an exemplary embodiment of the present invention applied to a powertrain of a seven-speed automatic transmission having six friction members prevents abrupt shift shock by providing a fail-safe function in two ways.

According to an embodiment of the present invention, a hydraulic pressure control valve and a switching valve are applied to each frictional element, and in particular, the controlling pressure range of the second brake may be changed depending on high and low gears. Therefore, more precise and more effective control is enabled, achieving minimization of a shift shock, an enhancement of drivability, and also an enhancement of fuel consumption.

Furthermore, the first brake and the third clutch is controlled by one pressure control valve, and accordingly, an overall performance of an automatic transmission may be enhanced by a simplified configuration of a hydraulic control system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of a seven-speed automatic transmission for a vehicle, comprising:
   a first clutch control portion controlling a forward range pressure according to a control of a first proportional control solenoid valve so as to supply the forward range pressure to a first clutch at first, second, third, fourth, and fifth forward speeds and preventing hydraulic pressure from being supplied to the first clutch when the first proportional control solenoid valve is turned off at fourth, fifth, sixth, and seventh forward speeds;
   a first brake and third clutch control portion controlling and selectively supplying the forward range pressure to a first brake or a third clutch according to a control of a second proportional control solenoid valve at the fourth, fifth, sixth, and seventh forward speeds, a low L range, and a reverse R range and maintaining a hydraulic line to the third clutch at the fourth, fifth, sixth, and seventh forward speeds in the case that an on/off solenoid valve controlling a spool valve controlling the hydraulic line to the third clutch malfunctions to be turned off;
   a second clutch control portion supplying a line pressure to a second clutch according to a control of a third proportional control solenoid valve at the third, fifth, and sixth forward speeds and a reverse speed;
   a second brake control portion supplying the forward range pressure to a second brake according to a control of a fourth proportional control solenoid valve at the second and seventh forward speeds and controlling an operating pressure of the second brake to be larger at the seventh forward speed than at the second forward speed; and
   a fourth clutch control portion supplying an operating pressure to a fourth clutch according to a control of a fifth proportional control solenoid valve at the first, second, third, fourth, sixth, and seventh forward speeds and the reverse speed.

2. The hydraulic control system of claim 1, wherein:
   the first, second, third, and fifth proportional control solenoid valves are duty control valves outputting a maximum hydraulic pressure in a turned-off state; and
   the fourth proportional control solenoid valve is a duty control valve outputting a minimum hydraulic pressure in a turned-off state.

3. The hydraulic control system of claim 1, wherein the first clutch control portion comprises:
   a first clutch side switching valve and a first clutch side pressure control valve controlled by the first proportional control solenoid valve; and
   a first switching valve controlling operating pressure supply to the first clutch through the first clutch side pressure control valve by controlling a hydraulic line of the forward range pressure supplied from a manual valve.

4. The hydraulic control system of claim 3, wherein the first clutch side switching valve comprises:
   a valve body comprising a first port receiving a control pressure from the first proportional control solenoid valve, a second port formed at an opposite side of the first port and receiving a reduced pressure of a reducing valve as its control pressure, a third port partially receiving the operating pressure supplied to the first clutch, and a fourth port selectively supplying the hydraulic pressure received through the third port to the first clutch side pressure control valve as a control pressure thereof; and
   a valve spool comprising a first land receiving the control pressure supplied from the first port, and a second land receiving the control pressure supplied through the second port and selectively enabling communication of the third and fourth ports, cooperatively with the first land,
   wherein the first land is provided with an elastic member forming an elastic force that always biases the valve spool toward a position at which it inhibits communication between the third and fourth ports.

5. The hydraulic control system of claim 3, wherein the first clutch side pressure control valve comprises:
   a valve body comprising a first port receiving a control pressure from the first clutch side switching valve, a second port receiving a control pressure from the first proportional control solenoid valve, a third port receiving an operating pressure of the first clutch supplied from the first switching valve, a fourth port selectively supplying the hydraulic pressure received through the third port to the first clutch, and a fifth port returning the hydraulic pressure received through the fourth port; and
   a valve spool comprising a first land selectively closing the third port by the control pressure received through the first port, a second land enabling communication of the third and fourth ports or the fourth and fifth ports in cooperation with the first land, and a third land receiving the control pressure supplied through the second port,
   wherein an elastic member is disposed between the first land and the valve body.

6. The hydraulic control system of claim 3, wherein the first switching valve comprises:

a valve body comprising a first port receiving the forward range pressure, a second port receiving the line pressure as its control pressure, a third port supplying the hydraulic pressure received through the first port to the first clutch side pressure control valve, a fourth port receiving the operating pressures of the second clutch and the second brake as its control pressure, a fifth port receiving the operating pressure of the fourth clutch as its control pressure, a sixth port receiving the operating pressure of the third clutch as its control pressure, and a seventh port exhausting the hydraulic pressure received through the third port; and a valve spool comprising a first land receiving the control pressure supplied through the second port, a second land receiving the hydraulic pressure supplied through the fifth port and selectively enabling communication of the third port to the first and sixth ports, a third land receiving the control pressure supplied through the fifth port, and a fourth land receiving the control pressure supplied through the fourth port, wherein an elastic member is disposed between the third land and the valve body.

7. The hydraulic control system of claim 6, wherein the first switching valve is structured such that, while the control pressure is supplied through the first port, the valve spool moves toward the first port only when the control pressures are supplied through all of the fourth, fifth, and sixth ports.

8. The hydraulic control system of claim 1, wherein the first brake and third clutch control portion comprises:

a third clutch side switching valve and a third clutch side pressure control valve controlled by the second proportional control solenoid valve;

a control valve controlled by the line pressure and an on/off solenoid valve and enabling hydraulic line conversion of hydraulic pressure supplied from the third clutch side pressure control valve;

a second switching valve controlled by an on/off solenoid valve and supplying the hydraulic pressure supplied from the control valve to the third clutch.

9. The hydraulic control system of claim 8, wherein the third clutch side switching valve comprises:

a valve body comprising a first port receiving a control pressure from the second proportional control solenoid valve, a second port formed at an opposite side of the first port and receiving a reduced pressure of a reducing valve as its control pressure, a third port partially receiving the operating pressure supplied to the first brake or the third clutch, and a fourth port selectively supplying the hydraulic pressure received through the third port to the third clutch side pressure control valve as a control pressure thereof; and a valve spool comprising a first land receiving the control pressure supplied from the first port and a second land receiving the control pressure supplied through the second port and selectively enabling communication of the third and fourth ports, wherein the first land is provided with an elastic member forming an elastic force that always biases the valve spool toward a position at which it inhibits communication between the third and fourth ports.

10. The hydraulic control system of claim 8, wherein the third clutch side pressure control valve comprises:

a valve body comprising a first port receiving a control pressure from the second proportional control solenoid valve, a second port receiving a control pressure from the third clutch side switching valve, a third port receiving the forward range pressure from a manual valve, a fourth port supplying the hydraulic pressure received through the third port to the control valve and the third clutch side switching valve, and a fifth port returning the hydraulic pressure received through the fourth port; and a valve spool comprising a first land selectively closing the third port by the control pressure received through the second port, a second land enabling communication of the third and fourth ports or the fourth and fifth ports in cooperation with the first land, and a third land receives the control pressure supplied through the second port, wherein an elastic member is disposed between the first land and the valve body.

11. The hydraulic control system of claim 8, wherein the control valve comprises:

a valve body comprising a first port receiving the line pressure, a second port receiving a control pressure from the second on/off solenoid valve, a third port receiving a hydraulic pressure from the third clutch side pressure control valve, a fourth port supplying the hydraulic pressure received through the third port to the first brake as an operating pressure thereof a fifth port supplying the hydraulic pressure received through the third port to the second switching valve, a sixth port exhausting the hydraulic pressure supplied through the fifth port, and a seventh port receiving an operating pressure from the third clutch as its control pressure; and a valve spool comprising a first land receiving a control pressure supplied through the second port, a second land selectively enabling communication of the fourth port to an exhaust port, a third land selectively enabling communication of the third port to the fourth and fifth ports, a fourth land selectively opening the fifth port by the control pressure supplied through the first port, and a fifth land receiving the control pressure supplied through the seventh port.

12. The hydraulic control system of claim 8, wherein the second switching valve comprises:

a valve body comprising a first port receiving a control pressure from the fourth proportional control solenoid valve, a second port supplying the control pressure received through the first port to a second brake side pressure control valve, a third port receiving a hydraulic pressure from the control valve as an operating pressure for the third clutch, a fourth port supplying the hydraulic pressure received through the third port to the third clutch, a fifth port exhausting the hydraulic pressure supplied through the fourth port, sixth and seventh ports bifurcated from the fourth port and utilizing the hydraulic pressure output from the fourth port as a control pressure of the second switching valve, and an eighth port receiving a control pressure from the first on/off solenoid valve; and a valve spool comprising a first land selectively opening the first port, a second land selectively enabling communication of the first and second ports in cooperation with the first land, a third land selectively enabling communication of the third and fourth ports in cooperation with the second land, and a fourth land receiving the control pressure supplied through the eighth port, wherein the third land and the fourth land are dividedly formed, and wherein an elastic member is disposed between the first land and the valve body.

13. The hydraulic control system of claim 12, wherein the third and fourth lands are dividedly formed such that the divided position may be placed at the sixth port when the valve spool is moved to the right and at the seventh port when moved to the left.

14. The hydraulic control system of claim 1, wherein the second clutch control portion comprises a second clutch side switching valve and a second clutch side pressure control valve that are controlled by the third proportional control solenoid valve such that a hydraulic pressure may be supplied to the second clutch.

15. The hydraulic control system of claim 14, wherein the second clutch side switching valve comprises:

a valve body comprising a first port receiving a control pressure from the third proportional control solenoid valve, a second port disposed opposite to the first port and receiving a reduced pressure of a reducing valve as its control pressure, a third port partially receiving the operating pressure of the second clutch supplied from the second clutch side pressure control valve, and a fourth port supplying the hydraulic pressure selectively received through the third port to the second clutch side pressure control valve as its control pressure; and a valve spool comprising a first land receiving a control pressure supplied through the first port and a second land receiving a control pressure supplied through the second port and selectively enabling communication of the third and fourth ports in cooperation with the first land, wherein the first land is provided with an elastic member forming an elastic force that always biases the valve spool toward a position at which it inhibits communication between the third and fourth ports.

16. The hydraulic control system of claim 14, wherein the second clutch side pressure control valve comprises:

a valve body comprising a first port receiving a control pressure from the third proportional control solenoid valve, a second port receiving a control pressure from the second clutch side switching valve, a third port receiving the line pressure, a fourth port supplying the hydraulic pressure received through the third port to the second clutch, and a fifth port exhausting the hydraulic pressure supplied through the fourth port; and a valve spool comprising a first land receiving the control pressure supplied through the first port, a second land selectively opening/closing the fifth port, and a third land selectively enabling communication of the fourth port to the third and fifth ports in cooperation with the second land, wherein an elastic member is disposed between the third land and the valve body.

17. The hydraulic control system of claim 1, wherein the second brake control portion comprises a second brake side switching valve and a second brake side pressure control valve that are controlled by the fourth proportional control solenoid valve such that the second brake may receive an hydraulic pressure.

18. The hydraulic control system of claim 17, wherein the second brake side switching valve comprises:

a valve body comprising a first port receiving a control pressure from the fourth proportional control solenoid valve, a second port disposed opposite to the first port and receiving a reduced pressure of a reducing valve as its control pressure, a third port partially receiving the operating pressure of the second brake supplied from the second brake side pressure control valve, and a fourth port supplying the hydraulic pressure of the third port to the second brake side pressure control valve as its control pressure; and a valve spool comprising a first land receiving the control pressure supplied from the first port and a second land receiving the control pressure supplied through the second port and selectively enabling communication of the third and fourth ports in cooperation with the first land, wherein the first land is provided with an elastic member forming an elastic force that always biases the valve spool toward a position at which it inhibits communication between the third and fourth ports.

19. The hydraulic control system of claim 17, wherein the second brake side pressure control valve comprises:

a valve body comprising a first port receiving a control pressure from the fourth proportional control solenoid valve, a second port receiving a control pressure from the second brake side switching valve, a third port receiving the line pressure, a fourth port supplying the hydraulic pressure received through the third port to the second brake, a fifth port exhausting the hydraulic pressure supplied through the fourth port, and a sixth port communicating with the second port of a second switching valve; and a valve spool comprising a first land receiving the control pressure supplied through the first port, a second land selectively opening/closing the fifth port, a third land selectively enabling communication of the fourth port to the third and fifth ports in cooperation with the second land, and a fourth land receiving the control pressure supplied through the second port, wherein an elastic member is disposed between the fourth land and the valve body.

20. The hydraulic control system of claim 14, wherein a first switching valve is connected to an upstream side of the second clutch and the second brake interposing a second shuttle valve, such that the hydraulic pressure supplied to the second clutch and the second brake may partially be supplied to the first switching valve.

21. The hydraulic control system of claim 1, wherein the fourth clutch control portion comprises a fourth clutch side switching valve and a fourth clutch pressure control valve that are controlled by the fifth proportional control solenoid valve such that the second brake may receive an hydraulic pressure.

22. The hydraulic control system of claim 21, wherein the fourth clutch side switching valve comprises:

a valve body of the fourth clutch side switching valve comprising a first port receiving a control pressure from the fifth proportional control solenoid valve, a second port disposed opposite to the first port and receiving the reduced pressure of a reducing valve as its control pressure, a third port partially receiving the operating pressure of the fourth clutch supplied from the fourth clutch side pressure control valve, and a fourth port supplying the hydraulic pressure selectively received through the third port to the fourth clutch side pressure control valve as its control pressure; and a valve spool comprising a first land receiving the control pressure of the first port, and a second land receiving the control pressure supplied through the second port and enabling selective communication of the third and fourth ports and in cooperation with the first land, wherein an elastic member is disposed between the first land and the valve body.

23. The hydraulic control system of claim 21, wherein the fourth clutch pressure control valve comprises:

a valve body of the fourth clutch pressure control valve comprising a first port receiving a control pressure from the fifth proportional control solenoid valve, a second port receiving a control pressure the fourth clutch side switching valve, a third port receiving the line pressure, a fourth port supplying the hydraulic pressure received through the third port to the fourth clutch, and a fifth port exhausting the hydraulic pressure supplied through the fourth port; and a valve spool comprising a first land receiving the control pressure supplied through the first port, a second land selectively opening/closing the fifth port, and a third land enabling selective communication of the fourth port to the third and fifth ports in cooperation with the second land, wherein an elastic member is disposed between the third land and the valve body.

* * * * *